United States Patent [19]

Fariss et al.

[11] 3,920,878
[45] Nov. 18, 1975

[54] PLASTICIZED POLYVINYL BUTYRAL INTERLAYERS

[75] Inventors: Robert H. Fariss, Amherst; James A. Snelgrove, Monson, both of Mass.

[73] Assignee: Monsanto Company, St. Louis, Mo.

[22] Filed: Nov. 18, 1974

[21] Appl. No.: 524,851

Related U.S. Application Data

[62] Division of Ser. No. 371,014, June 18, 1973, Pat. No. 3,884,865.

[52] U.S. Cl. ............................ 428/437; 156/106
[51] Int. Cl.² .................................. B32B 17/10
[58] Field of Search ............... 106/316; 156/106; 260/31.8 R, 31.8 L, 73 L; 428/437

[56] References Cited
UNITED STATES PATENTS

| | | | |
|---|---|---|---|
| 2,124,315 | 7/1938 | Ryan | 156/106 X |
| 2,690,410 | 9/1954 | Nelson | 428/437 |
| 3,326,707 | 6/1967 | Huber | 106/316 |
| 3,402,139 | 9/1968 | Mont et al. | 156/106 X |
| 3,437,553 | 4/1969 | Hailstone | 156/106 X |
| 3,522,143 | 7/1970 | Motter | 428/437 |
| 3,841,955 | 10/1974 | Coaker et al. | 428/437 |

Primary Examiner—William J. Van Balen
Assistant Examiner—Henry F. Epstein

[57] ABSTRACT

Disclosed herein are polyvinyl butyral resins having a polyvinyl alcohol content in the range of from 12 to 20% by weight which are plasticized with from 15 to 45 parts by weight of dihexyl adipate per hundred parts of polyvinyl butyral resin. The plasticized resins are especially useful as the interlayer in laminated safety glass in architectural and vehicle applications.

5 Claims, No Drawings

PLASTICIZED POLYVINYL BUTYRAL INTERLAYERS

This is a division of application Ser. No. 371,014, filed June 18, 1973, now U.S. Pat. No. 3,884,865.

BACKGROUND OF THE INVENTION

1. Field of the Invention

The present invention relates to plasticized polyvinyl butyral interlayers used in laminated safety glass. More particularly, the present invention relates to polyvinyl butyral resin having a polyvinyl alcohol (PVOH) content in the range of from 12 to 20% by weight which is plasticized with from 15 to 45 parts by weight of dihexyl adipate per hundred parts of polyvinyl butyral resin.

2. Description of the Prior Art

Laminated safety glass made from a plasticized polyvinyl butyral interlayer is widely used in automobile windshields and in certain architectural applications. To date, despite the fact that the prior art teaches a seemingly endless variety of plasticizers for polyvinyl butyral, only a few plasticizers have enjoyed widespread commercial use in the polyvinyl butyral interlayers for laminated safety glass. One reason for this is that polyvinyl butyral is a complex resin that can be made with wide variation in the amount of butyral groups, hydroxyl groups (polyvinyl alcohol content) and residual ester groups. Superimposed on top of this is the wide variations in molecular weights that are possible with polyvinyl butyral resins.

Thus, many well known plasticizers for synthetic polymers are incompatible or only partially compatible with all of the various polyvinyl butyral resins. Plasticizers that are compatible with polyvinyl butyral resins may be rejected for use in the critical windshields and architectural applications where very rigid performance standards must be met. For one reason or another many plasticizers for polyvinyl butyral will not provide the properties required in these high performance applications. One such property that is required in laminated safety glass is edge stability or resistance to delamination. Many otherwise suitable plasticizers for polyvinyl butyral fail to qualify for interlayer use because they increase the susceptibility of the laminate to delaminate. In other words, they fail to provide the necessary laminate stability.

The art teaches that certain dialkyl esters of adipic acid are suitable for plasticizing polyvinyl butyral. U.S. Pat. No. 2,124,315 states that the methyl, ethyl, propyl, butyl, amyl and octyl esters of adipic acid work satisfactorily as plasticizers for polyvinyl butyral resin. Noticeably absent from this list are the hexyl esters of adipic acid. The 1972–1973 Modern Plastics Encyclopedia at page 463 indicates that dihexyl adipate is only partially compatible with polyvinyl butyral which may explain why this material is not specifically included in the teaching of U.S. Pat. No. 2,124,315.

SUMMARY OF THE INVENTION

The present invention fulfills a need in the art by providing plasticized polyvinyl butyral interlayers for use in laminated safety glass, wherein the plasticizer is dihexyl adipate. The interlayers of the present invention exhibit excellent edge stability which makes them especially useful in the preparation of glazing units for automobile windshields and certain architectural applications wherein the laminates are constantly exposed to the weather. Laminate edge stability is obtained without sacrificing any of the other desirable properties such as optical clarity, impact strength, etc.

DESCRIPTION OF THE PREFERRED EMBODIMENTS

The plasticizers used in the present invention are dihexyl esters of adipic acid. The hexyl moiety of the ester in n-hexyl or any of the various branched hexyl radicals. Also contemplated are mixtures of straight chain and branched hexyl radicals.

The polyvinyl butyral resins employed in the present invention have Staudinger molecular weights ranging from about 30,000 to 600,000 and preferably from 45,000 to 250,000 and may be considered to be made up, on a weight basis, of from 12 to 20% and preferably 16.5 to 19.5% hydroxyl groups, calculated as polyvinyl alcohol (PVOH); 0 to 10% and preferably 0 to 3% residual ester groups, calculated as polyvinyl ester, e.g., acetate; and the balance substantially butyraldehyde acetal.

The amount of plasticizer used is in the range of from 15 to 45 parts per hundred parts of polyvinyl butyral resin (PHR). The final choice as to the amount of plasticizer used will depend on the polyvinyl butyral resin used as well as the properties desired in a particular application. However, it should be noted that as the polyvinyl alcohol content of the resin increases the resin becomes less compatible with the dihexyl adipate plasticizers. Thus, when using resin containing higher levels of polyvinyl alcohol, less plasticizer should be used to avoid incompatibility in the resin and resulting adverse performance in the resulting laminate.

The relationship between the maximum amount of plasticizer to be used and the polyvinyl alcohol content of the resin may be expressed by -

Letting $X$ = the weight % polyvinyl alcohol in the resin; and $Y$ = parts of plasticizer per hundred of resin.

Then the amount of plasticizer and the percent polyvinyl alcohol content in the resin is selected so that the sum of 3.2 times the percent of polyvinyl alcohol content and the parts of plasticizer per hundred parts of resin is equal to or less than 100, i.e., $3.2X+Y \leq 100$.

The lower limit on the amount of plasticizer to be used is 15 parts per hundred parts of resin (PHR). As noted above, the compatibility of the polyvinyl butyral resin and the plasticizer increases with decreasing polyvinyl alcohol content of the resin. However, decreasing polyvinyl alcohol content in the resin results in physical properties changes, for example, decreasing modulus. Thus, the minimum amount of plasticizer to be used will ultimately depend on the PVOH content of the resin, the molecular weight of the resin and the properties desired in the final laminate.

When using resins with a polyvinyl alcohol content in the preferred range of from 16.5 to 19.5% by weight the preferred amount of plasticizer will be in the range of from 25 to 40 parts per hundred parts of resin.

With the above factors in mind, one skilled in the art will be able to select the particular resin and amount of plasticizer for any given application.

The test methods used in connection with the present invention are described below:

Compatibility

The compatibility of the plasticizer system with the resin is determined by blending appropriate amounts of plasticizer and polyvinyl butyral resin in a Brabender mixer equipped with sigma blades. The blending is carried out at 150°C. at 50 rpm for 7 minutes. The resulting mixture is pressed into 30 mil sheets using a heated hydraulic press (300°F.) using 800 psi for 5 minutes. The sheet is then cut into samples 2 × 2 inches and stored at 100% relative humidity and 72°F. for 5 days. The samples are then visually examined for exudation of the plasticizer which is an indication of incompatibility. If there is no visible exudation and if the sample does not stain paper upon which it is laid, then the plasticizer is determined to be compatible with the resin.

Edge Stability

Edge stability is determined by preparing a laminate by interposing a 30 mil thick plasticized interlayer between two 12 × 12 × 0.100 inch panels of glass. The sandwich is then subjected to a temperature of about 275°F. at a pressure of 185 psi for approximately 10 minutes to laminate the glass to the interlayer. The laminates are then exposed in Arizona, Florida and Massachusetts at an angle of 45° and observed periodically for signs of edge delamination and compared to a control laminate.

100% Tensile Modulus

The modulus is measured on 30 mil sheet material which is conditioned overnight and tested at 50% relative humidity at 72°F. The sheet is cut into strips ½ inch × 6 inches and tested on an Instron tester. The sample is placed in the jaws of the tester so as to provide a 2 inch gauge length of sample between the jaws of the tester. The sample is elongated to a gauge length of 4 inches at an elongation rate (cross heat speed) of 5 inches per minute. The force (psi) required to elongate the sample is reported as 100% tensile modulus. For automobile windshields and architectural use, interlayer material should have a modulus in the range of from 100 to 1000 psi and more preferably, from 200 to 800 psi in order to provide the necessary impact strength in the resulting laminate.

The following examples are set forth to illustrate the present invention and are not to be construed as limitations thereof. The references to parts of plasticizer in the resin are to parts per hundred parts of polyvinyl butyral resin (PHR). All other parts and percentages are by weight unless otherwise indicated. All of the polyvinyl butyral resins used have molecular weights in the range from 45,000 to 250,000.

EXAMPLES 1 to 28

The following examples illustrate the use of dihexyl adipate to plasticize polyvinyl butyral resins which differ in polyvinyl alcohol content. The polyvinyl butyral resins used have a residual acetate content of less than 3% and a polyvinyl alcohol content as indicated. The samples are prepared and tested as outlined above. In Examples 1 to 24 di-n-hexyl adipate (DHA) is used as the plasticizer while a mixture of about 40% n-hexyl and about 60% branched hexyl adipate (DIHA) is used in Examples 25 to 28. The results of this test are set forth in Table I below:

TABLE I

SUMMARY OF EXAMPLES 1 to 28

| EXAMPLE | %PVOH (X) | PLASTICIZER- | PHR (Y) | 3.2X+Y | COMPAT-IBILITY | MODULUS |
|---|---|---|---|---|---|---|
| 1 | 12 | DHA | 15 | 53 | C | 946 |
| 2 | " | " | 20 | 58 | C | — |
| 3 | " | " | 25 | 63 | C | 121 |
| 4 | " | " | 30 | 68 | C | 76 |
| 5 | " | " | 40 | 78 | C | — |
| 6 | 18.2 | " | 36 | 94 | C | — |
| 7 | 18.4 | " | 30 | 89 | C | 580 |
| 8 | " | " | 32 | 91 | C | 366 |
| 9 | " | " | 35 | 94 | C | 304 |
| 10 | " | " | 40 | 99 | C | 216 |
| 11 | " | " | 45 | 104 | I | — |
| 12 | " | " | 50 | 109 | I | — |
| 13 | 18.8 | " | 34 | 93 | C | — |
| 14 | 19.5 | " | 30 | 92 | C | 647 |
| 15 | " | " | 33.5 | 96 | C | — |
| 16 | " | " | 35 | 97 | C | 376 |
| 17 | " | " | 40 | 102 | I | 264 |
| 18 | " | " | 42 | 104 | I | — |
| 19 | 21.1 | " | 25 | 93 | C | — |
| 20 | " | " | 30 | 98 | C | — |
| 21 | " | " | 35 | 103 | I | — |
| 22 | 21.5 | " | 20 | 89 | C | 2207 |
| 23 | " | " | 30 | 99 | C | 1311 |
| 24 | " | " | 35 | 104 | I | 631 |
| 25 | " | DIHA | 30 | 99 | C | 1391 |
| 26 | 20.8 | " | 30 | 97 | C | 1021 |
| 27 | 19.2 | " | 35 | 96.5 | C | 433 |
| 28 | 18.8 | " | 35 | 95 | C | 307 |

In the foregoing Table, under the column heading "Compatibility," the expression "C" is used to designate that the system is compatible while the expression "I" is used to designate that the system is incompatible.

The data in Table I above illustrate that at higher levels of polyvinyl alcohol content in the polyvinyl butyral resin (Examples 14 to 24). increasing amounts of dihexyl adipate plasticizer leads to incompatibility. Examples 12, 17, 18, 21 and 24 illustrate the incompatibility that arises when the value of 3.2X+Y is greater than 100.

Examples 19 to 24 illustrate that when the polyvinyl alcohol content is as high as 21%, only up to about 30 parts of plasticizer can be tolerated in the resin while maintaining compatibility. Such materials are unsuitable for use as laminated safety glass in automobile windshields as these materials have moduli over 1000 psi and do not provide the required impact properties over a broad temperature range which are required in automobile windshields.

Examples 6 to 10, 13 to 16 and 27 to 28 fall within the preferred range of the present invention in regard to polyvinyl alcohol content (16.5 to 19.5%), amount of DHA plasticizer (25 to 40 PHR), the value of $3.2X+Y \leq 100$ and moduli (200 to 800 psi) at 72°F.

EXAMPLES 29 to 39

Examples 29 to 39 are set forth to illustrate the edge stability of the laminates prepared from the plasticized interlayers of the present invention. The laminates are prepared using polyvinyl butyral resin with less than 3% residual acetate groups and with the indicated polyvinyl alcohol (PVOH) contents, alkalinity titer contents in the range of from 20 to 40 and a moisture content in the range of from 0.2 to 0.5% by weight. The butyral resin is plasticized and formed into laminates as outlined above and then set out for outdoor exposures in Arizona, Florida, and Massachusetts at an angle of 45°. At the end of 3 months, the laminates are examined visually for edge stability and compared to Control Example 29 wherein the interlayer is plasticized with 42 parts per hundred parts of resin of triethylene glycol di(2-ethyl butyrate). This latter material is widely used in automobile windshields and is considered as a standard for the purposes of the present invention. A summary of the test samples and the test results is tabulated in Table II below.

TABLE II
SUMMARY OF EXAMPLES 29 to 39

| EXAMPLE | % PVOH (X) | PLASTICIZER-PHR (Y) | | 3.2X+Y | EDGE STABILITY |
|---|---|---|---|---|---|
| 29 | 21.1 | triethylene glycol di(2-ethyl butyrate) 42 | | — | satisfactory |
| 30 | 21.1 | DHA | 42 | 110 | unsatisfactory |
| 31 | 19.1 | " | 30 | 91 | satisfactory |
| 32 | 18.9 | " | 30 | 90 | satisfactory |
| 33 | 18.5 | " | 30 | 89 | satisfactory |
| 34 | 18.2 | " | 30 | 88 | satisfactory |
| 35 | 12.5 | " | 18 | 58 | satisfactory |
| 36 | 21.5 | dibutoxyethyl adipate | 35 | 104 | unsatisfactory |
| 37 | 20.8 | " | 35 | 101.5 | unsatisfactory |
| 38 | 19.5 | " | 40 | 102.5 | unsatisfactory |
| 39 | 18.4 | " | 40 | 99 | unsatisfactory |

The above data indicates the satisfactory edge stability of the dihexyl adipate plasticized interlayers of the present invention.

The following Examples 40 to 58, which are summarized in Table III below, illustrate the use of other dialkyl adipates to plasticize various polyvinyl butyral resins.

TABLE III
SUMMARY OF EXAMPLES 40 to 58

| EXAMPLE | % PVOH | PLASTICIZER - PHR | | COMPATIBILITY* | MODULUS |
|---|---|---|---|---|---|
| 40 | 21.5 | dibutyl adipate | 50 | C | — |
| 41 | " | dioctyl adipate | 20 | I | 1668 |
| 42 | " | " | 30 | I | — |
| 43 | 20.8 | " | 30 | I | — |
| 44 | 19.2 | " | 30 | I | 1544 |
| 45 | 18.8 | " | 30 | I | 1478 |
| 46 | 21.5 | diisoheptyl adipate | 20 | C | 2259 |
| 47 | " | " | 30 | I | 1523 |
| 48 | 20.8 | " | 30 | I | 1052 |
| 49 | 19.2 | " | 30 | C | 977 |
| 50 | 18.8 | " | 30 | " | 920 |
| 51 | 21.5 | didecyl adipate | 30 | I | — |
| 52 | 20.8 | " | 30 | I | — |
| 53 | 19.2 | " | 30 | I | — |
| 54 | 18.8 | " | 30 | I | — |
| 55 | 21.5 | dioctadecyl adipate | 30 | I | — |
| 56 | 20.8 | " | 30 | I | — |
| 57 | 19.2 | " | 30 | I | — |
| 58 | 18.2 | " | 30 | I | — |

*C = Compatible, I = Incompatible

The data in Table III above illustrate the compatibility of adipate plasticizers with polyvinyl butyral resin increases with decreasing polyvinyl alcohol content in the resin and with decreasing chain length in the alcohol moiety of the adipate ester. Dibutyl adipate is compatible with polyvinyl butyral resins having polyvinyl alcohol contents at least up to 25% by weight. However, such plasticizers are more volatile than the longer chain adipate esters and this volatility causes bubbles, edge separation and a tendency toward delamination in the resulting laminated safety glass. Laminates prepared from a 20.8% polyvinyl alcohol content resin and 42 parts of dibutyl adipate were set out in Florida, Arizona and Massachusetts for edge stability studies. These laminates were found to be significantly poorer than the control laminates prepared using triethylene glycol di(2-ethyl butyrate) as the plasticizer and judged to be unsatisfactory for use in architectural or automobile windshield applications. One possible reason for the poor performance is the higher volatility of the dibutyl adipate as compared to the dihexyl adipates.

It may be possible to achieve compatibility in the above systems by decreasing the amount of plasticizer.

However, at low levels of plasticizer, the modulus of the interlayer usually increases to a point where it is not suitable for use in automobile windshields.

EXAMPLE 59

The following example illustrates other properties of a safety glass laminated intended for use in automobile windshields which is made from a dihexyl adipate plasticized interlayer of the present invention. The control laminate is prepared using a conventional polyvinyl butyral interlayer having a polyvinyl alcohol content of 20.8% by weight, which is plasticized with triethylene glycol di(2-ethyl butyrate) while the dihexyl adipate is used in an interlayer having a polyvinyl alcohol content of 18.8% by weight.

| PLASTICIZER/PHR | CONTROL TRIETHYLENE GLYCOL DI-(2-ETHYL BUTYRATE)/ 42 PHR | EXAMPLE 59 DIHEXYL ADIPATE/ 33 PHR |
|---|---|---|
| Interlayer thickness (mils) | 30.4 | 30.3 |
| % $H_2O$ | 0.46 | 0.41 |
| Alkalinity Titer | 101 | 99 |
| 100% Modulus at 72°F. (psi) | 376 | 426 |
| Pummel Adhesion | 5.0 | 5.1 |
| Mean Penetration Velocity (Miles per hour) | | |
| 0°F | 16.4 | 17.3 |
| 70°F. | 25.1 | 27.1 |
| 120°F. | 16.1 | 15.9 |

The above data indicates that 33 parts of dihexyl adipate in a polyvinyl butyral resin having a polyvinyl alcohol content of 18.8% by weight has interlayer and laminate properties comparable to a conventional material using 42 parts of triethylene glycol di(2-ethyl butyrate) in a polyvinyl butyral resin having 20.8% by weight of polyvinyl alcohol groups.

Laminated glazing units may also be prepared from the plasticized interlayers of the present invention using rigid transparent plastic materials in place of the glass used in the above examples.

The present invention also contemplates the use of various adjuncts and additives in the plasticized polyvinyl butyral interlayers of the present invention. Such materials would include dyes, pigments, stabilizers, antioxidants, alkalinity titer control agents, adhesion modifiers, etc.

From the foregoing, it should be apparent that many variations and modifications can be made in the present invention without departing from the spirit and scope thereof.

What is claimed is:

1. Laminated glazing units comprising a polyvinyl butyral interlayer laminated between two rigid transparent sheets wherein the polyvinyl butyral interlayer has a molecular weight in the range of from 30,000 to 600,000, from 0 to 10% by weight residual ester groups, calculated as polyvinyl ester, and a hydroxyl content in the range of from 12 to 20% by weight calculated as polyvinyl alcohol which is plasticized with from 15 to 45 parts by weight of dihexyl adipate per hundred parts of polyvinyl butyral resin; wherein the sum of (a) 3.2 times the percent polyvinyl alcohol content and (b) the parts of plasticizer per hundred parts of resin is equal to or less than 100; and wherein the plasticized interlayer has a 100% tensile modulus at 72°F. in the range of from 100 to 1000 psi.

2. Laminated glazing units as in claim 1 wherein the adipate plasticizer is di-n-hexyl adipate.

3. Laminated glazing units as in claim 1 wherein the adipate plasticizer is branched hexyl adipate.

4. Laminated glazing units as in claim 1 wherein the adipate plasticizer is a mixed ester of n-hexyl adipate and branched hexyl adipate.

5. Laminated safety glass comprising a polyvinyl butyral interlayer laminated between two sheets of glass hwerein the polyvinyl butyral interlayer has a molecular weight in the range of from 45,000 to 250,000, from 0 to 3% by weight residual acetate groups, calculated as by vinyl acetate, and a hydroxyl content in the range of from 16.5 to 19.5% by weight calculated as polyvinyl alcohol which is plasticized with from 25 to 40 parts by weight of dihexyl adipate per hundred parts of polyvinyl butyral resin; wherein the sum of (a) 3.2 times the percent polyvinyl alcohol content and (b) the parts of plasticizer per hundred parts of resin is equal to or less than 100 and wherein the interlayer has a 100% tensile modulus at 72°F. in the range of from 200 to 800 psi.

* * * * *